US008370951B1

(12) United States Patent
Christian

(10) Patent No.: US 8,370,951 B1
(45) Date of Patent: Feb. 5, 2013

(54) SECURING THE U.S.A

(75) Inventor: Linda Jennie Christian, Buena Park, CA (US)

(73) Assignee: Linda Christian, Buena Park, CA (US)

(*) Notice: Subject to any disclaimer, the term of this patent is extended or adjusted under 35 U.S.C. 154(b) by 0 days.

(21) Appl. No.: 13/180,086

(22) Filed: Jul. 11, 2011

Related U.S. Application Data

(60) Provisional application No. 61/516,286, filed on Apr. 1, 2011.

(51) Int. Cl.
*H04L 29/06* (2006.01)
(52) U.S. Cl. .............................. 726/26; 716/28; 705/325
(58) Field of Classification Search .................... 726/26, 726/28; 705/325
See application file for complete search history.

(56) References Cited

U.S. PATENT DOCUMENTS

| 7,853,535 | B2 * | 12/2010 | Colella ........................... 705/67 |
| 8,009,873 | B2 * | 8/2011 | Chapman ....................... 382/115 |
| 8,050,992 | B2 * | 11/2011 | Wu ................................ 705/35 |
| 2011/0204142 | A1 * | 8/2011 | Rao ................................ 235/380 |

FOREIGN PATENT DOCUMENTS

KR        2000-0050216        *    8/2000

OTHER PUBLICATIONS

Aichholzer, Georg et al., "The Austrian case: multi-card concept and relationship between citizen ID and social security cards," Mar. 26, 2010, Springerlink.com, pp. 65-85.*
Marien, Ilse et al., "The Belgian e-ID and its complex path to implementation and innovation change," Mar. 2, 2010, Springerlink.com, pp. 27-41.*
Arora, Siddhartha, "National e-ID card schemes: A European overview," 2008, Information Security Technical Report 13, pp. 46-53.*

* cited by examiner

*Primary Examiner* — Michael Pyzocha

(57) ABSTRACT

Internet users will be accountable for their use by opening their internet with State Abbreviation and State Code and 13 digit numbers. Traveling State to State, State to Country, Country to Country you also have transfer code that applies to each Internet users. Internet users have to purchase ID card they will receive upon signing Contract Release that applies to each Category. Framework for software program consist of map with State abbreviation & State Codes, Country Abbreviation, Country Codes 5 Internet Contract Release forms with Fees, Framework for opening page that will scroll to what pertains to individuals. Internet ID Temp permit, Transfer code application for travelers, Transfer code receipt for customer code, map with Codes for U.S.A., Special Intelligence format a mandatory software format for internet Companies. This program is made to free internet users from, violent offenders, Identity theft, pirating, help import, export, And Keep Defense Information Safe.

1 Claim, 2 Drawing Sheets

SECURING THE U.S.A

FIELD OF INVENTION

The present invention relates to monitoring illegal behavior on the Internet using an ID.

BACKGROUND OF THE INVENTION

There are known identification cards, such as licenses, but none are required for accessing the Internet or allow for monitoring of user's actions on the Internet.

BRIEF SUMMARY OF THE INVENTION

It is therefore an object of the invention are to create a system to monitor illegal behavior on the internet comprising: an ID card including a photo, a state code, and a unique number obtained from an agency after filing an application with a fee based on a particular category, wherein the unique number includes a state number and a 13 digit number which identifies at least: applicant income; whether the applicant is a felon; whether the applicant is a government worker; and applicant's residence; wherein the category is based on an applicant's income or employer; a map correlating the state code and state number to each individual state; a database storing the applicant's identifying information; and software to modify each Internet company's opening page to require a user to enter the unique number from the ID card, thereby allowing law enforcement to determine who performed illegal actions. Intentions to sell concept to party that can either hold on to the patent or construct the concept.

DETAILED DESCRIPTION OF THE INVENTION

Figure 1:
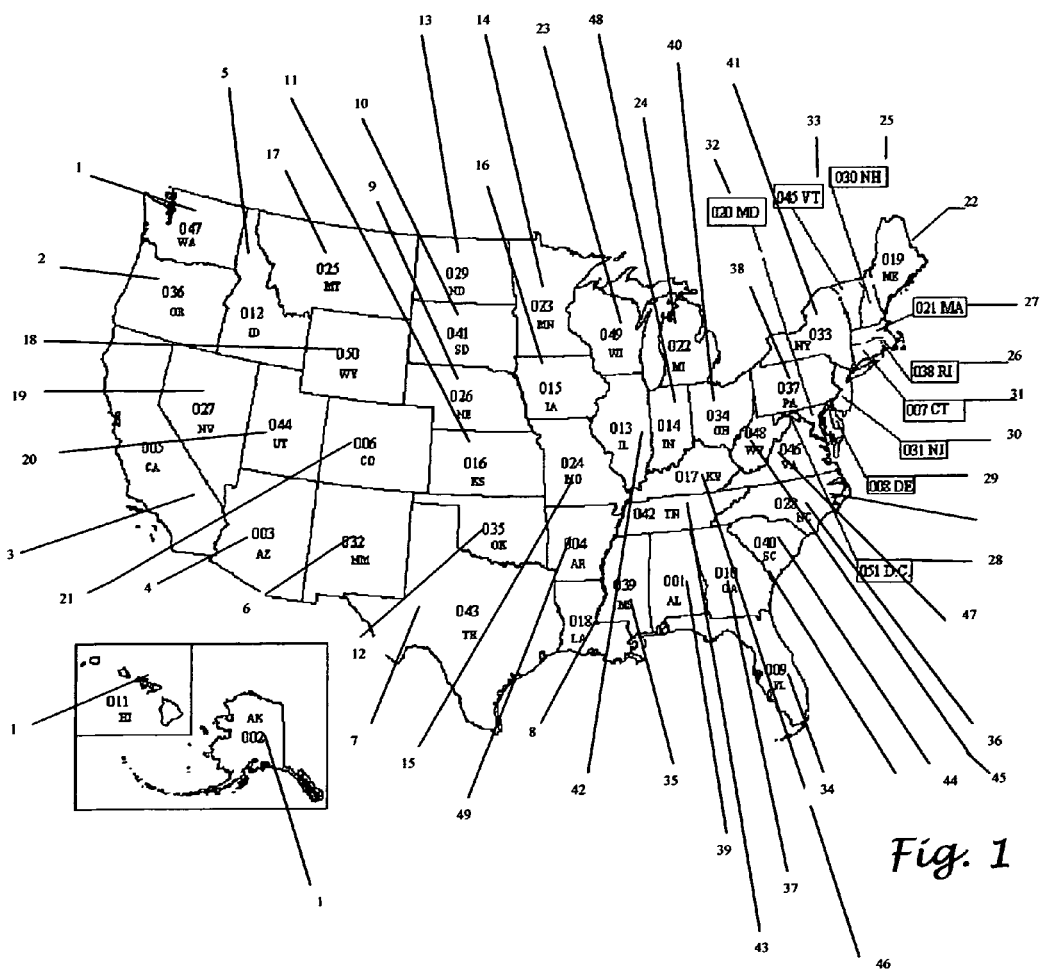
FIG. 1 is a map with codes and abbreviations for each state in the U.S.A.

The description of my invention consists of taking the population of each state subtracting the computer user in percentages from the population putting them into categories such as 20% of computers users in the low income ($6.00), 20% middle class ($12.00) 20% and high income ($14.00). 10% of Exempt category (State, Government, Federal, County, City facilities, 10% of Computer users for registered Sex offenders and or violent offenders (purchase fee $16). In which I will then place a fee for each category in which it will be mandatory for them to purchase a state ID number which consists of a state Abbreviation, state code#, 13 digits and photo ID. It will be mandatory for all internet companies to purchase a software program for a small fee of $60 which will modify their opening page to open with a scroll down category list. On the category list will list fees for transfer fees for state to state, country to country along with visa cards for country to country as well as their state to state, or state to country etc., As you will see in the following applications. This will be a way of holding a Computer User Accountable of any Illegal use through their Computer. I also take 10% of the Population of California as an example and put them back to work at a pay scale of $16.00 as you will see on all formula's. This is a way to hold all Computer User's Accountable If they are using there Computer's for any Illegal use. By using 10% of CA Population and putting people back to work. It is a WIN WIN Bail Out for the U.S.A.

My concept is to disable any illegal use through a computer by giving the computer user a state code and state number with an ID# that consists of 17 digits that will be mandatory to purchase through a company, or department of my own, or if I sell it to the Government through the DMV offices. For a regular customer a fee that will be explained on each application that will be mandatory to be filled out a fee paid in the category they fall in and a photo will be required to be kept on file at the time of purchase of their state ID card. All companies, corporations and small business' will have a different number, they will have the same state ID, state code and a 13 digit number but will begin with a symbol at the beginning of the number separating and defining companies, corporations and small business'. All internet companies will also have the same state code, state number and 13 digit number required with the symbol at the end separating them from their customers. All travelers traveling state to state will require a transfer code which will be the state they are leavings state code ID number and the state they are arriving state ID number to access any state to country or country to country computer user will need to enter their departing state code, state 13 digit number as well as their transfer and visa number and or green card number or registered Pedophiles # and violent offenders that have a issued registration number and will be mandatory when scrolling down to enter the category. This will allow monitoring for our safety as individuals and safety to the United States of America from any illegal computer users. (Fee's Exempt all Facility's such as Educational State, Federal, Gov., City and County) If applicable all educational facilities such as colleges, universities, public schools as well as police depts., fire depts., departments of corrections, prisons, post offices, DMV and Secretary of State. All offices will need to enter a district number plus the state code, the state number, the 13 digit code which will pertain to particular Departments, as an example below.

Figure 2:
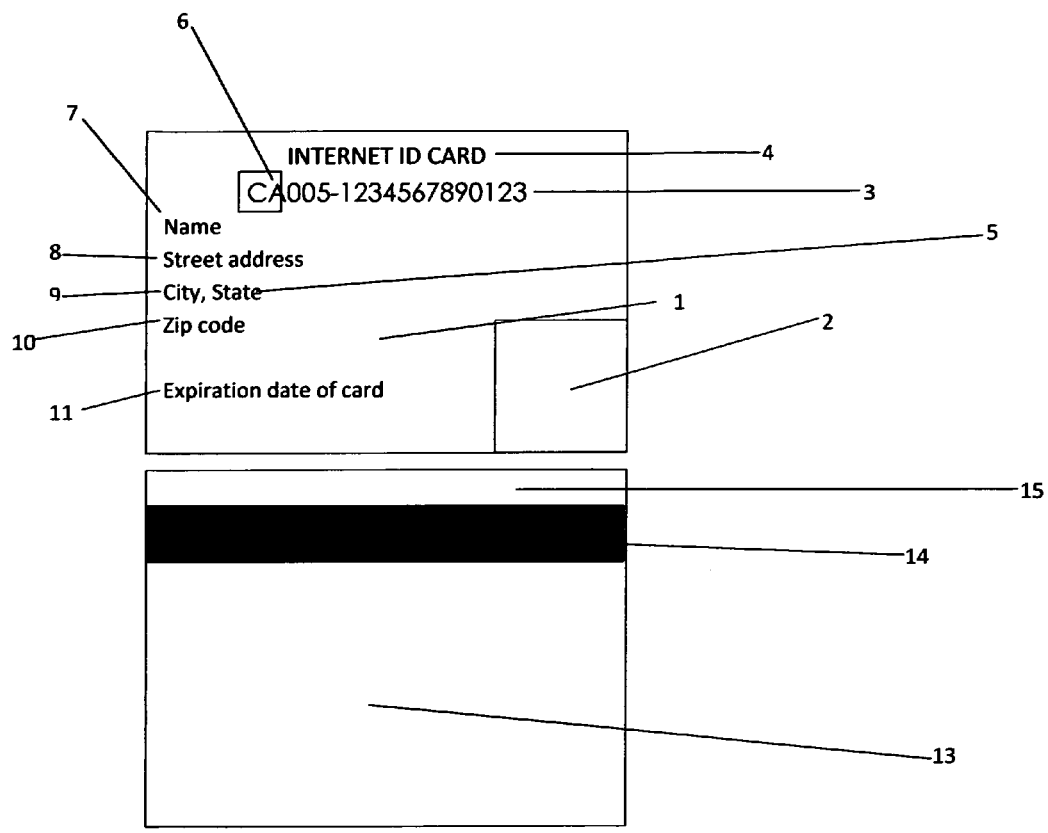
FIG. 2 is an example identification card in accordance with the present invention.
Figure 2:
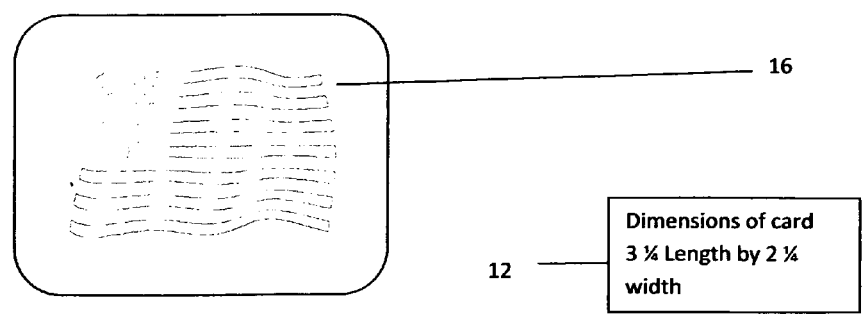

EXAMPLE→Fullerton Police Dept. (PD+24+CA005+the 13 digit number) Police Dept.—Station Number—State Code—13 digit number FIG. 2 shows an example of an ID card in accordance with the present application:

1) this figures identifies the front of the card. The purpose of the card is for users of the program to be identified.

2) This is where the identifying picture will be placed picture is of the card holder.

3) This 16 number code is to identify user of the internet, where the card holder is registered, registration numbers will be assigned at time of purchasing of internet card, this also identifies how they are registered (thru what system they have registered), identifies income, if you are a felon, if you are a government worker, state you live in, the first three numbers identify the state (These numbers are State Codes as shown in FIG. 1) The remaining numbers are the identifiers of other things said such as stated above.

4) name of the card.

5) (Address) State of Internet card holder.

6) (CA is used as an example code) (code used for agency to identify state registration).

7) Name of internet card holder.

8) Street address of internet card holder.

9) (Address) City of internet card holder.

10) (Address) Zip code of Internet card holder.

11) Expiration of internet card (expiration date should last as long as purchaser of program decides sufficient).

12) Dimensions of card should be 3% width by 2% in Length, dimensions of Internet ID card (Can only be changed by purchaser of Securing the U.S.A program).

The objective of this card is for identification of internet user, (Internet ID Card) this card is to issued the internet user card purchaser, card will be issued to persons who have paid for the right to access the Internet. Internet card holder shall then after be held responsible for any and all Illegal action done on any and all devices held and used by the internet card holder. This will help identify where illegal actions are being done and keep track of users performing illegal action.

This is profitable, and when executed will profit into the trillions as listed in Cost and Profit formulas. Any Company or Closed Internet that purchases this will be released of any and all Law suits by a Contract Release Form that is required to be signed at the time the Computer User Signature and Fees are paid as you will see on all of the Computer Release Forms and fees for each Categories. There is a Computer User ID card as you'll see on all the Computer User Release forms and fees for each Category. There is a Computer User ID CARD as you'll see and expiration Date of every Two years in which charges will apply.

It will be Mandatory to modify their Login Face page, in order for the computer user's to log in, their Computer Users Customers. State Abbreviation, State Code, Thirteen Digit #.

Example as Followed Below

Categories List:

1. Individual Computer Users (Low Income)
2. Individual Computer Users (Middle Income)
3. Individual Computer Users (High Income) (Co., Corp., and Business)
4. Exempt for Facilities as follows Educational, State, Gov., Federal, City, and County Offices.
5. Registered Sex offenders and or Violent Offenders must add along with entering their State Abbreviation, State Code, Thirteen Digit #, their Registered Offense number.
6. Travelers State to State, State to Country, Country to Country, Must add with entering their Original State Abbreviation, State Code, Thirteen Digit # their Visa # and or Transfer # or if Non Citizenship your Green Card #.
7. Military Branch or Rank, Must Enter Original State Abbreviation, State Code, Thirteen Digit # along with their DC # or what applies to Identifying them by their Military #.

Special Intelligence ONLY:

1. C.I.A.
2. F.B.I.
3. A.T.F.
4. D.E.A.
5. Delta
6. Space Program (NASA)
7. White House Officials
8. Capitol Hill Officials
9. U.S. Representatives
10. Pentagon Officials
11. Top Secret ONLY All Special Intelligence Only List will not be opened to the view of the naked eye of the computer user's. It will only open up when a special Code Enter. Software and Program Cost is $60.00 Purchased Only by Internet Co Requirements needed when purchasing your Internet Business License # expiration date; All Internet Co. will be subject to any and all Modifying changes that might take place in the future. The Cost will be determined when and if changes are needed. All DATA must be kept on Internet Data Base if needed to be viewed by LAW ENFORCEMENT no longer then ten years.

The following is a listing of the state and country codes:

| State | State Abbreviation | State Code |
|---|---|---|
| Alabama | AL | 001 |
| Alaska | AK | 002 |
| Arizona | AZ | 003 |
| Arkansas | AR | 004 |
| California | CA | 005 |
| Colorado | CO | 006 |
| Connecticut | CT | 007 |
| Delaware | DE | 008 |
| Florida | FL | 009 |
| Georgia | GA | 010 |
| Hawaii | HI | 011 |
| Idaho | ID | 012 |
| Illinois | IL | 013 |
| Indiana | IN | 014 |
| Iowa | IA | 015 |
| Kansas | KS | 016 |
| Kentucky | KY | 017 |
| Louisiana | LA | 018 |
| Maine | ME | 019 |
| Maryland | MD | 020 |
| Massachusetts | MA | 021 |
| Michigan | MI | 022 |
| Minnesota | MN | 023 |
| Mississippi | MS | 039 |
| Missouri | MO | 024 |
| Montana | MT | 025 |
| Nebraska | NE | 026 |
| Nevada | NV | 027 |
| N. Carolina | NC | 028 |
| N. Dakota | ND | 029 |
| New Hampshire | NH | 030 |
| New Jersey | NJ | 031 |
| New Mexico | NM | 032 |
| New York | NY | 033 |
| Ohio | OH | 034 |
| Oklahoma | OK | 035 |
| Oregon | OR | 036 |
| Pennsylvania | PA | 037 |
| Rhode Island | RI | 038 |
| S. Carolina | SC | 040 |
| S. Dakota | SD | 041 |
| Tennessee | TN | 042 |
| Texas | TX | 043 |
| Utah | UT | 044 |
| Vermont | VT | 045 |
| Virginia | VA | 046 |
| Washington | WA | 047 |
| West Virginia | WV | 048 |
| Wisconsin | WI | 049 |
| Wyoming | WY | 050 |
| District of Colombia | DC | 051 |

| Country | Country Abbreviations | Country Codes |
|---|---|---|
| AFGHANISTAN | AF | 0052 |
| ALBANIA | AL | 0053 |
| ALGERIA | DZ | 0054 |
| AMERICAN SAMOA | AS | 0055 |
| ANDORRA | AD | 0056 |
| ANGOLA | AO | 0057 |
| ANGUILLA | AI | 0058 |
| ANTARCTICA | AQ | 0059 |
| ANTIGUA AND BARBUDA | AG | 0060 |
| ARGENTINA | AR | 0061 |
| ARMENIA | AM | 0062 |
| ARUBA | AW | 0063 |
| AUSTRALIA | AU | 0064 |
| AUSTRIA | AT | 0065 |
| AZERBAIJAN | AZ | 0066 |
| BAHAMAS | BS | 0067 |
| BAHRAIN | BH | 0068 |
| BANGLADESH | BD | 0069 |
| BARBADOS | BB | 0070 |

-continued

| | | |
|---|---|---|
| BELARUS | BY | 0071 |
| BELGIUM | BE | 0072 |
| BELIZE | BZ | 0073 |
| BENIN | BJ | 0074 |
| BERMUDA | BM | 0075 |
| BHUTAN | BT | 0076 |
| BOLIVIA | BO | 0077 |
| BOSNIA AND HERZEGOWINA | BA | 0078 |
| BOTSWANA | BW | 0079 |
| BOUVET ISLAND | BV | 0080 |
| BRAZIL | BR | 0081 |
| BRITISH INDIAN OCEAN TERRITORY | IO | 0082 |
| BRUNEI DARUSSALAM | BN | 0083 |
| BULGARIA | BG | 0084 |
| BURKINA FASO | BF | 0085 |
| BURUNDI | BI | 0086 |
| CAMBODIA | KH | 0087 |
| CAMEROON | CM | 0088 |
| CANADA | CA | 0089 |
| CAPE VERDE | CV | 0090 |
| CAYMAN ISLANDS | KY | 0091 |
| CENTRAL AFRICAN REPUBLIC | CF | 0092 |
| CHAD | TD | 0093 |
| CHILE | CL | 0094 |
| CHINA | CN | 0095 |
| CHRISTMAS ISLAND | CX | 0096 |
| COCOS (KEELING) ISLANDS | CC | 0097 |
| COLOMBIA | CO | 0098 |
| COMOROS | KM | 0099 |
| CONGO | CG | 0100 |
| CONGO, THE DRC | CD | 0101 |
| COOK ISLANDS | CK | 0102 |
| COSTA RICA | CR | 0103 |
| COTE D'IVOIRE | CI | 0104 |
| CROATIA (local name: Hrvatska) | HR | 0105 |
| CUBA | CU | 0106 |
| CYPRUS | CY | 0107 |
| CZECH REPUBLIC | CZ | 0108 |
| DENMARK | DK | 0109 |
| DJIBOUTI | DJ | 0110 |
| DOMINICA | DM | 0111 |
| DOMINICAN REPUBLIC | DO | 0112 |
| EAST TIMOR | TP | 0113 |
| ECUADOR | EC | 0114 |
| EGYPT | EG | 0115 |
| EL SALVADOR | SV | 0116 |
| EQUATORIAL GUINEA | GQ | 0117 |
| ERITREA | ER | 0118 |
| ESTONIA | EE | 0119 |
| ETHIOPIA | ET | 0120 |
| FALKLAND ISLANDS (MALVINAS) | FK | 0121 |
| FAROE ISLANDS | FO | 0122 |
| FIJI | FJ | 0123 |
| FINLAND | FI | 0124 |
| FRANCE | FR | 0125 |
| FRANCE, METROPOLITAN | FX | 0126 |
| FRENCH GUIANA | GF | 0127 |
| FRENCH POLYNESIA | PF | 0128 |
| FRENCH SOUTHERN TERRITORIES | TF | 0129 |
| GABON | GA | 0130 |
| GAMBIA | GM | 0131 |
| GEORGIA | GE | 0132 |
| GERMANY | DE | 0133 |
| GHANA | GH | 0134 |
| GIBRALTAR | GI | 0135 |
| GREECE | GR | 0136 |
| GREENLAND | GL | 0137 |
| GRENADA | GD | 0138 |
| GUADELOUPE | GP | 0139 |
| GUAM | GU | 0140 |
| GUATEMALA | GT | 0141 |
| GUINEA | GN | 0142 |
| GUINEA-BISSAU | GW | 0143 |
| GUYANA | GY | 0144 |
| HAITI | HT | 0145 |
| HEARD AND MC DONALD ISLANDS | HM | 0146 |
| HOLY SEE (VATICAN CITY STATE) | VA | 0147 |
| HONDURAS | HN | 0148 |
| HONG KONG | HK | 0149 |
| HUNGARY | HU | 0150 |
| ICELAND | IS | 0151 |
| INDIA | IN | 0152 |
| INDONESIA | ID | 0153 |
| IRAN (ISLAMIC REPUBLIC OF) | IR | 0154 |
| IRAQ | IQ | 0155 |
| IRELAND | IE | 0156 |
| ISRAEL | IL | 0157 |
| ITALY | IT | 0158 |
| JAMAICA | JM | 0159 |
| JAPAN | JP | 0160 |
| JORDAN | JO | 0161 |
| KAZAKHSTAN | KZ | 0162 |
| KENYA | KE | 0163 |
| KIRIBATI | KI | 0164 |
| KOREA, D.P.R.O. | KP | 0165 |
| KOREA, REPUBLIC OF | KR | 0166 |
| KUWAIT | KW | 0167 |
| KYRGYZSTAN | KG | 0168 |
| LAOS | LA | 0169 |
| LATVIA | LV | 0170 |
| LEBANON | LB | 0171 |
| LESOTHO | LS | 0172 |
| LIBERIA | LR | 0173 |
| LIBYAN ARAB JAMAHIRIYA | LY | 0174 |
| LIECHTENSTEIN | LI | 0175 |
| LITHUANIA | LT | 0176 |
| LUXEMBOURG | LU | 0177 |
| MACAU | MO | 0178 |
| MACEDONIA | MK | 0179 |
| MADAGASCAR | MG | 0180 |
| MALAWI | MW | 0181 |
| MALAYSIA | MY | 0182 |
| MALDIVES | MV | 0183 |
| MALI | ML | 0184 |
| MALTA | MT | 0185 |
| MARSHALL ISLANDS | MH | 0186 |
| MARTINIQUE | MQ | 0187 |
| MAURITANIA | MR | 0188 |
| MAURITIUS | MU | 0189 |
| MAYOTTE | YT | 0190 |
| MEXICO | MX | 0191 |
| MICRONESIA, FEDERATED STATES OF | FM | 0192 |
| MOLDOVA, REPUBLIC OF | MD | 0193 |
| MONACO | MC | 0194 |
| MONGOLIA | MN | 0195 |
| MONTSERRAT | MS | 0196 |
| MOROCCO | MA | 0197 |
| MOZAMBIQUE | MZ | 0198 |
| MYANMAR (Burma) | MM | 0199 |
| NAMIBIA | NA | 0200 |
| NAURU | NR | 0201 |
| NEPAL | NP | 0202 |
| NETHERLANDS | NL | 0203 |
| NETHERLANDS ANTILLES | AN | 0204 |
| NEW CALEDONIA | NC | 0205 |
| NEW ZEALAND | NZ | 0206 |
| NICARAGUA | NI | 0207 |
| NIGER | NE | 0208 |
| NIGERIA | NG | 0209 |
| NIUE | NU | 0210 |
| NORFOLK ISLAND | NF | 0211 |
| NORTHERN MARIANA ISLANDS | MP | 0212 |
| NORWAY | NO | 0213 |
| OMAN | OM | 0214 |
| PAKISTAN | PK | 0215 |
| PALAU | PW | 0216 |
| PANAMA | PA | 0217 |
| PAPUA NEW GUINEA | PG | 0218 |
| PARAGUAY | PY | 0219 |
| PERU | PE | 0220 |
| PHILIPPINES | PH | 0221 |
| PITCAIRN | PN | 0222 |
| POLAND | PL | 0223 |
| PORTUGAL | PT | 0224 |
| PUERTO RICO | PR | 0225 |
| QATAR | QA | 0226 |
| REUNION | RE | 0227 |
| ROMANIA | RO | 0228 |
| RUSSIAN FEDERATION | RU | 0229 |
| RWANDA | RW | 0230 |

| | | |
|---|---|---|
| SAINT KITTS AND NEVIS | KN | 0231 |
| SAINT LUCIA | LC | 0232 |
| SAINT VINCENT AND THE GRENADINES | VC | 0233 |
| SAMOA | WS | 0234 |
| SAN MARINO | SM | 0235 |
| SAO TOME AND PRINCIPE | ST | 0236 |
| SAUDI ARABIA | SA | 0237 |
| SENEGAL | SN | 0238 |
| SEYCHELLES | SC | 0239 |
| SIERRA LEONE | SL | 0240 |
| SINGAPORE | SG | 0241 |
| SLOVAKIA (Slovak Republic) | SK | 0242 |
| SLOVENIA | SI | 0243 |
| SOLOMON ISLANDS | SB | 0244 |
| SOMALIA | SO | 0245 |
| SOUTH AFRICA | ZA | 0246 |
| SOUTH GEORGIA AND SOUTH S.S. | GS | 0247 |
| SPAIN | ES | 0248 |
| SRI LANKA | LK | 0249 |
| ST. HELENA | SH | 0250 |
| ST. PIERRE AND MIQUELON | PM | 0251 |
| SUDAN | SD | 0252 |
| SURINAME | SR | 0253 |
| SVALBARD AND JAN MAYEN ISLANDS | SJ | 0254 |
| SWAZILAND | SZ | 0255 |
| SWEDEN | SE | 0256 |
| SWITZERLAND | CH | 0257 |
| SYRIAN ARAB REPUBLIC | SY | 0258 |
| TAIWAN, PROVINCE OF CHINA | TW | 0259 |
| TAJIKISTAN | TJ | 0260 |
| TANZANIA, UNITED REPUBLIC OF | TZ | 0261 |
| THAILAND | TH | 0262 |
| TOGO | TG | 0263 |
| TOKELAU | TK | 0264 |
| TONGA | TO | 0265 |
| TRINIDAD AND TOBAGO | TT | 0266 |
| TUNISIA | TN | 0267 |
| TURKEY | TR | 0268 |
| TURKMENISTAN | TM | 0269 |
| TURKS AND CAICOS ISLANDS | TC | 0270 |
| TUVALU | TV | 0271 |
| UGANDA | UG | 0272 |
| UKRAINE | UA | 0273 |
| UNITED ARAB EMIRATES | AE | 0274 |
| UNITED KINGDOM | GB | 0275 |
| UNITED STATES | US | 0276 |
| U.S. MINOR ISLANDS | UM | 0277 |
| URUGUAY | UY | 0278 |
| UZBEKISTAN | UZ | 0279 |
| VANUATU | VU | 0280 |
| VENEZUELA | VE | 0281 |
| VIET NAM | VN | 0282 |
| VIRGIN ISLANDS (BRITISH) | VG | 0283 |
| VIRGIN ISLANDS (U.S.) | VI | 0284 |
| WALLIS AND FUTUNA ISLANDS | WF | 0285 |
| WESTERN SAHARA | EH | 0286 |
| YEMEN | YE | 0287 |
| YUGOSLAVIA (Serbia and Montenegro) | YU | 0288 |
| ZAMBIA | ZM | 0289 |
| ZIMBABWE | ZW | 0290 |

The invention claimed is:

1. A system for monitoring illegal behavior on the internet comprising:
   an ID card including a photo, a state code, and a unique number obtained from an agency after filing an application with a fee based on a particular category,
      wherein the unique number includes a state number and a 13 digit number which identifies at least:
      applicant income;
      whether the applicant is a felon;
      whether the applicant is a government worker; and
      applicant's residence;
      wherein the category is based on an applicant's income or employer;
   a map correlating the state code and state number to each individual state;
   a database storing the applicant's identifying information; and
   software to modify each Internet company's opening page to require a user to enter the unique number from the ID card, thereby allowing law enforcement to determine who performed illegal actions.

* * * * *

UNITED STATES PATENT AND TRADEMARK OFFICE
CERTIFICATE OF CORRECTION

| | | |
|---|---|---|
| PATENT NO. | : 8,370,951 B1 | Page 1 of 1 |
| APPLICATION NO. | : 13/180086 | |
| DATED | : February 5, 2013 | |
| INVENTOR(S) | : Christian | |

It is certified that error appears in the above-identified patent and that said Letters Patent is hereby corrected as shown below:

In the Claims:

Col. 8 Claim 1 Line 17 remove the word "illegal"
Col. 8 Claim 1 Line 20 replace "agency" with "agency or company"
Col. 8 Claim 1 Line 34 replace "company's" with "agency's or company's"

Signed and Sealed this
Seventh Day of January, 2014

Margaret A. Focarino
*Commissioner for Patents of the United States Patent and Trademark Office*